(12) United States Patent
Burgman et al.

(10) Patent No.: US 7,314,127 B2
(45) Date of Patent: Jan. 1, 2008

(54) DUAL FUNCTION APPARATUS FOR CLUTCH FEED AND SYSTEM RETENTION

(75) Inventors: Boris I. Burgman, Oak Park, MI (US); Richard A. Pashnik, Saline, MI (US); Patrick S. Portell, Pinckney, MI (US)

(73) Assignees: GM Global Technology Operations, Inc., Detroit, MI (US); DaimlerChrysler AG, Stuttgart (DE); DaimlerChrysler Corporation, Auburn Hills, MI (US)

( * ) Notice: Subject to any disclaimer, the term of this patent is extended or adjusted under 35 U.S.C. 154(b) by 244 days.

(21) Appl. No.: 11/188,205

(22) Filed: Jul. 22, 2005

(65) Prior Publication Data

US 2006/0065508 A1    Mar. 30, 2006

Related U.S. Application Data

(60) Provisional application No. 60/613,557, filed on Sep. 27, 2004.

(51) Int. Cl.
F16D 25/0638    (2006.01)
F16D 25/12    (2006.01)

(52) U.S. Cl. .................................. 192/85 AA; 192/115
(58) Field of Classification Search ................. 192/115
See application file for complete search history.

(56) References Cited

U.S. PATENT DOCUMENTS

| | | | | |
|---|---|---|---|---|
| 5,083,992 | A * | 1/1992 | Asada | 475/278 |
| 2006/0022528 | A1* | 2/2006 | Burgman et al. | 310/54 |
| 2006/0037428 | A1* | 2/2006 | Klemen et al. | 74/606 R |
| 2006/0062506 | A1* | 3/2006 | Portell et al. | 384/542 |

* cited by examiner

*Primary Examiner*—Richard M Lorence

(57) ABSTRACT

An improved hybrid transmission including two electric motor/generator modules and a plurality of planetary gear sets operatively connectable to the motor/generators and to an engine is provided. Novel structural and packaging schemes enhance the function and efficiency of the transmission. More precisely, the present invention relates to an improved apparatus for retaining a clutch hub and providing hydraulic fluid to actuate a clutch.

14 Claims, 2 Drawing Sheets

DUAL FUNCTION APPARATUS FOR CLUTCH FEED AND SYSTEM RETENTION

CROSS REFERENCE TO RELATED APPLICATIONS

This Application claims the benefit of U.S. Provisional Application 60/613,557, filed Sep. 27, 2004, which is hereby incorporated by reference in its entirety.

TECHNICAL FIELD

This invention relates to a dual function apparatus for a hybrid electro-mechanical vehicular transmission.

BACKGROUND OF THE INVENTION

A hybrid electro-mechanical vehicular transmission utilizes interactive planetary gear arrangements that are operatively connected to an engine and two motor/generators. Selective utilization of torque transfer devices such as a clutch enable power transfer via the planetary gear arrangements from the engine and/or motor/generators to the output member of the transmission.

A power transmission in an electro-mechanical transmission is described in commonly owned U. S. Provisional Application entitled Electrically Variable Transmission with Selective Fixed Ratio Operation, Ser. No. 11/071406, Holmes et al., filed Mar. 3, 2005, and hereby incorporated by reference in its entirety.

SUMMARY OF THE INVENTION

An improved hybrid transmission including two electric motor/generator modules and a plurality of planetary gear sets operatively connectable to the motor/generators and to an engine is provided. Novel structural and packaging schemes enhance the function and efficiency of the transmission. More precisely, the present invention relates to an improved apparatus for retaining a clutch hub and providing hydraulic fluid to actuate a clutch.

The apparatus of the present invention includes a fluid source in fluid communication with a pump adapted to draw fluid therefrom. A housing member defines a first flow passage in fluid communication with the pump. A center support is disposed within the housing member and defines a second flow passage in fluid communication with the first flow passage. A clutch hub is attached to the center support and a clutch is disposed within the clutch hub. A plurality of fasteners attach the center support to the clutch hub. At least one of the fasteners is a hollow fastener defining a third flow passage in fluid communication with both the second flow passage and the clutch such that the clutch may be actuated by fluid from the fluid source.

In one aspect of the present invention, the apparatus of the present invention includes a valve body disposed between the pump and the first flow passage to selectively allow fluid from the fluid source to be transferred to the clutch.

In another aspect of the present invention, the plurality of fasteners include a plurality of threaded fasteners adapted to attach the center support and the clutch hub.

In yet another aspect of the present invention, the plurality of fasteners include five fasteners evenly distributed in a circular pattern.

The above features and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
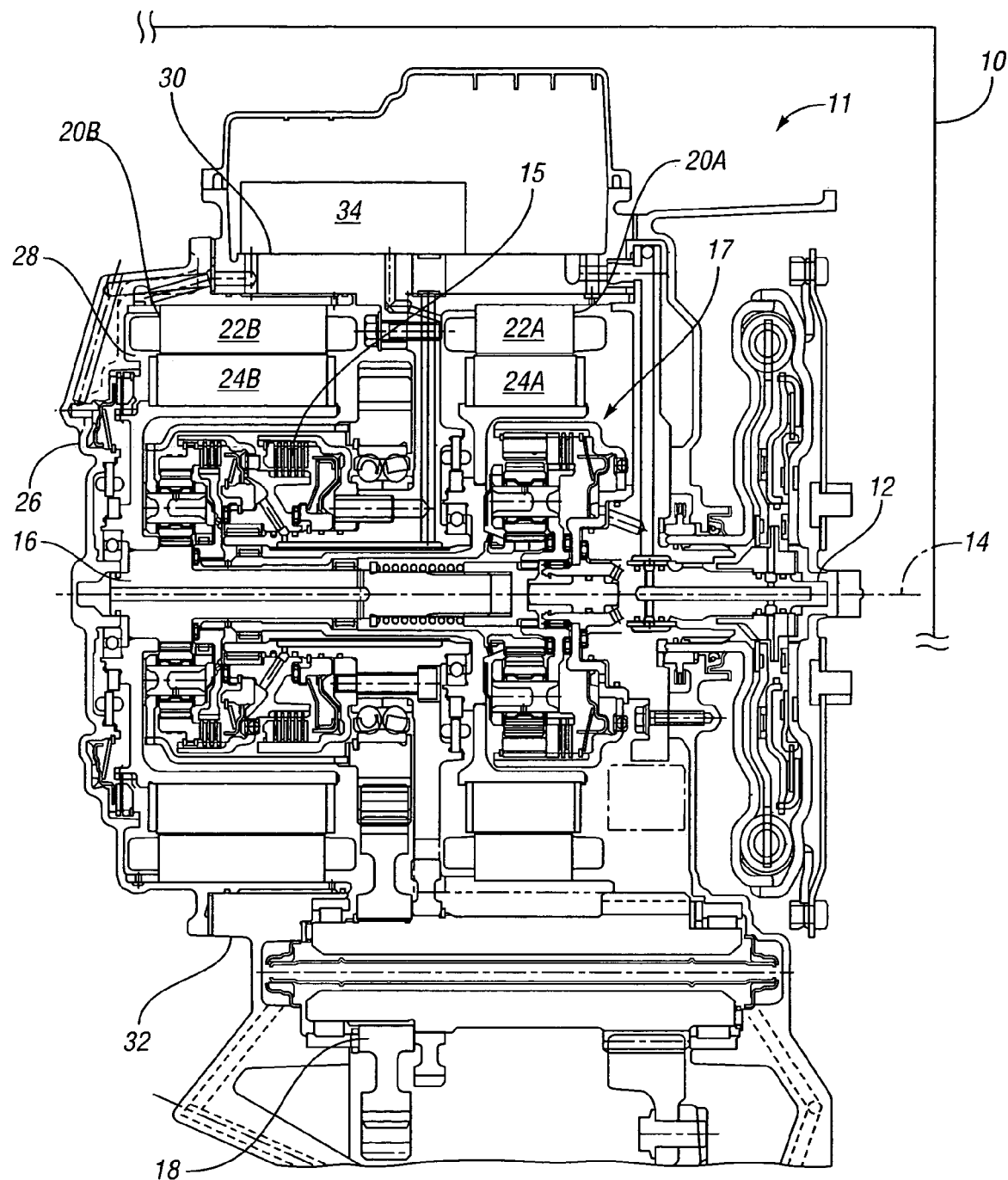
FIG. 1 is a schematic cross-sectional illustration in fragmentary view of a hybrid electrical/mechanical transmission.

Referring to the drawings wherein like reference numbers refer to like components, FIG. 1 shows a vehicle 10 having an electro-mechanical transmission 11. An input shaft 12 is disposed about a center axis 14 and is operable for transferring power from an engine (not shown) to the transmission 11. A main shaft 16 is longitudinally disposed and rotatable about the center axis 14 and is engageable with the input shaft 12. The engagement of one or more of a plurality of clutches such as clutch 15 interconnects one or more of a plurality of planetary gear sets such as planetary gear set 17 to transfer power at varying ratios to an output member 18. Two electric motor/generators 20A and 20B are coaxially oriented about the center axis 14. Each motor/generator 20A, 20B is operatively connectable to a member of one of the planetary gear sets to provide a range of continuously variable speed ratios between the input shaft 12 and the output member 18, as will be readily understood by those skilled in the art. Each of the motor/generators 20A, 20B includes a generally ring-shaped stator 22A, 22B, respectively, and a generally ring-shaped rotor 24A, 24B rotatable with respect to the respective stator 22A, 22B. An end cover 26 is mounted with respect to the main shaft 16 to partially encase the motor/generators 20A, 20B within and partially define an interior space 28. The end cover 26 cooperates with a first portion 30 of a housing member (i.e., an upper portion of a transmission case) and a second portion 32 of the housing member (i.e., a lower portion of the transmission case) to further encase the motors/generators 20A, 20B within the interior space 28.

Figure 2:
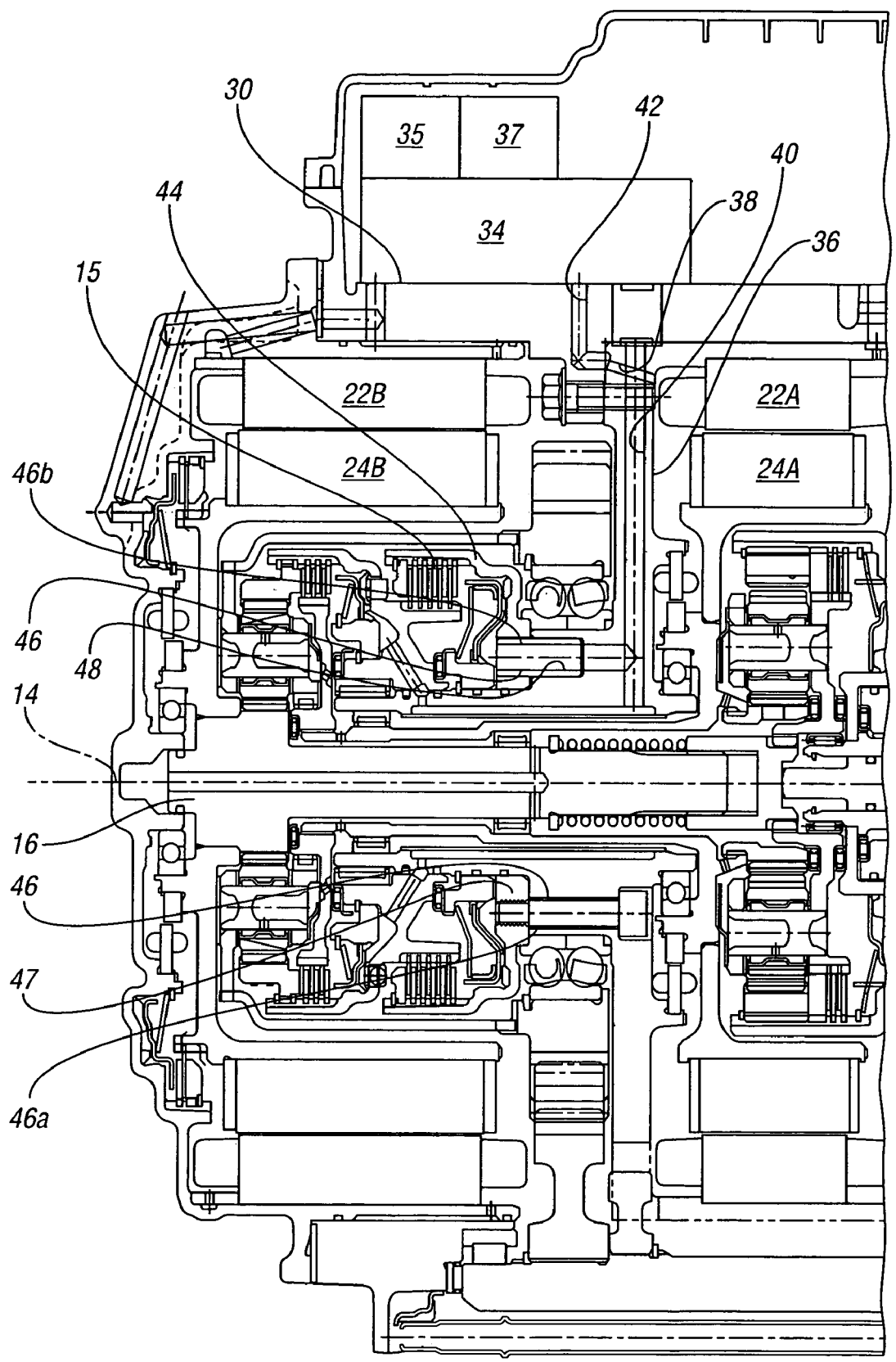
FIG. 2 is a schematic cross-sectional illustration in fragmentary view of a portion of the hybrid electrical/mechanical transmission of FIG. 1.

Referring now to FIG. 2, a valve body 34 is in fluid communication with a fluid source 35 and a pump 37, and is capable of delivering pressurized fluid. The fluid source 35 and pump 37 may be located anywhere on the vehicle and fluidly connected with the valve body 34, as will be understood by those skilled in the art.

A center support 36 is rigidly supported with respect to the main shaft 16 about the center axis 14 and preferably supports the stator 22A. A first flow passage 38 and a second flow passage 40 are formed within the center support 36 and are in fluid communication with the valve body 34 through a third flow passage 42 formed in the first portion 30 of the transmission case.

The clutch 15 is disposed within a housing or clutch hub 44 adapted to rotate about the center axis 14. The clutch hub 44 is mounted to the center support 36 by a plurality of fasteners 46. One or more of the fasteners 46 includes a fourth flow passage 48 disposed therein. In a preferred embodiment there are five fasteners 46 evenly distributed in a circular pattern. Four of the fasteners 46 are preferably solid fasteners 46a and one of the fasteners 46 is a hollow fastener 46b defining a flow passage 48 which is in fluid communication with the flow passage 40 and the clutch 15. The four solid fasteners 46a each preferably include a threaded end portion 47 to maintain engagement between the clutch hub 44 and the center support 36, whereas the hollow fastener 46b is preferably press fit into position between the clutch hub 44 and the center support 36. While the number and configuration of fasteners 46 have been described in the context of a preferred embodiment, it should be appreciated that alternate quantities and configurations of the fasteners 46 may be envisioned, and that the fasteners 46 may include different combinations of fasteners 46a and/or 46b.

Having described the structure of the present invention, it should be appreciated by one skilled in the art that the clutch 15 may be actuated by hydraulic fluid from the fluid source 35 in the following manner. Fluid from the fluid source 35 is delivered by the pump 37 through valve body 34, then through flow passages 42, 38, 40 and 48, and finally to the clutch 15 for the actuation thereof. Accordingly, the fasteners 46 serve a dual purpose. More precisely, the solid fasteners 46a serve to retain the clutch hub 44 to the center support 36 and the hollow fastener 46b provides pressurized hydraulic fluid for the actuation of the clutch 15.

While the best modes for carrying out the invention have been described in detail, those familiar with the art to which this invention relates will recognize various alternative designs and embodiments for practicing the invention within the scope of the appended claims.

The invention claimed is:

1. A vehicle transmission comprising:
    a fluid source;
    a housing member defining a first flow passage in fluid communication with the fluid source;
    a center support disposed within the housing member, the center support defining a second flow passage in fluid communication with the first flow passage;
    a clutch hub attached to the center support;
    a clutch disposed within the clutch hub; and
    a plurality of fasteners adapted to attach the center support to the clutch hub, wherein at least one of the fasteners is a hollow fastener defining a third flow passage in fluid communication with both the second flow passage and the clutch such that the clutch may be actuated by fluid from the fluid source.

2. The vehicle transmission of claim 1 further comprising a pump adapted to provide pressurized fluid from the fluid source to the clutch.

3. The vehicle transmission of claim 2 further comprising a valve body disposed between said pump and said first flow passage.

4. The vehicle transmission of claim 1, wherein the hollow fastener is press fit into position between the center support and the clutch hub.

5. The vehicle transmission of claim 1, wherein the plurality of fasteners include a plurality of threaded fasteners adapted to attach the center support and the clutch hub.

6. The vehicle transmission of claim 1, wherein the plurality of fasteners include five fasteners evenly distributed in a circular pattern.

7. A vehicle transmission comprising:
    a fluid source;
    a pump in fluid communication with the fluid source and adapted to draw fluid therefrom;
    a valve body in fluid communication with the pump;
    a housing member defining a first flow passage in fluid communication with the valve body;
    a center support disposed within the housing member, the center support defining a second flow passage in fluid communication with the first flow passage;
    a clutch hub attached to the center support;
    a clutch disposed within the clutch hub; and
    a plurality of fasteners adapted to attach the center support to the clutch hub, wherein at least one of the fasteners is a hollow fastener defining a third flow passage in fluid communication with both the second flow passage and the clutch such that the clutch may be actuated by fluid from the fluid source.

8. The vehicle transmission of claim 7, wherein the hollow fastener is press fit into position between the center support and the clutch hub.

9. The vehicle transmission of claim 7, wherein the plurality of fasteners include a plurality of threaded fasteners adapted to attach the center support and the clutch hub.

10. The vehicle transmission of claim 7, wherein the plurality of fasteners include five fasteners evenly distributed in a circular pattern.

11. A vehicle transmission comprising:
    a fluid source;
    a pump in fluid communication with the fluid source and adapted to draw fluid therefrom;
    a valve body in fluid communication with the pump;
    a housing member defining a first flow passage in fluid communication with the valve body;
    a center support disposed within the housing member, the center support defining a second and third flow passage in fluid communication with each other, the second flow passage being in fluid communication with the first flow passage;
    a clutch hub attached to the center support;
    a clutch disposed within the clutch hub; and
    a plurality of fasteners adapted to attach the center support to the clutch hub, wherein at least one of the fasteners is a hollow fastener defining a fourth flow passage in fluid communication with both the third flow passage and the clutch such that the clutch may be actuated by fluid from the fluid source.

12. The vehicle transmission of claim 11, wherein the hollow fastener is press fit into position between the center support and the clutch hub.

13. The vehicle transmission of claim 11, wherein the plurality of fasteners include a plurality of threaded fasteners adapted to attach the center support and the clutch hub.

14. The vehicle transmission of claim 11, wherein the plurality of fasteners include five fasteners evenly distributed in a circular pattern.

* * * * *